(12) United States Patent
Shiokawa et al.

(10) Patent No.: US 6,514,005 B2
(45) Date of Patent: Feb. 4, 2003

(54) APPARATUS FOR INSTALLING A MATERIAL WHICH IS PROCESSED BY USING CHEMICALS

(75) Inventors: Takeji Shiokawa, Tsukui-gun (JP); Mitsuya Mikawa, Isehara (JP); Toshimitsu Nakagawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 09/781,441

(22) Filed: Feb. 13, 2001

(65) Prior Publication Data

US 2001/0014253 A1 Aug. 16, 2001

(30) Foreign Application Priority Data

Feb. 14, 2000 (JP) ........................................ 2000-035346

(51) Int. Cl.[7] ................................................ F16B 35/06
(52) U.S. Cl. .................... 403/408.1; 411/339; 411/399; 411/177; 403/334; 403/253; 403/409.1
(58) Field of Search ................................ 411/150, 339, 411/177, 176, 399; 403/408.1, 253, 263, 299, 333, 334, 409

(56) References Cited

U.S. PATENT DOCUMENTS

| | | | | |
|---|---|---|---|---|
| 2,096,335 A | * | 10/1937 | Nicholas | 411/150 |
| 2,307,080 A | * | 1/1943 | Schaefer | 411/150 |
| 2,347,219 A | * | 4/1944 | Schnell | 411/150 |
| 3,434,521 A | * | 3/1969 | Flora | 411/150 |
| 3,459,447 A | * | 8/1969 | Hurd et al. | 411/150 |
| 3,982,363 A | * | 9/1976 | Dorris | 411/150 |
| 4,033,243 A | * | 7/1977 | Kirrish et al. | 411/150 |
| 4,490,083 A | * | 12/1984 | Rebish | 411/338 |
| 6,261,042 B1 | * | 7/2001 | Pratt | 411/551 |

FOREIGN PATENT DOCUMENTS

| | | | | |
|---|---|---|---|---|
| DE | 728022 | * | 11/1942 | 411/150 |
| GB | 846185 | * | 8/1960 | 411/176 |

* cited by examiner

*Primary Examiner*—Lynne H. Browne
*Assistant Examiner*—Kenn Thompson
(74) *Attorney, Agent, or Firm*—Mattingly, Stanger & Malur, P.C.

(57) ABSTRACT

A member coupling device is provided for use with a treatment apparatus which uses chemicals. The member coupling device is formed with a tapered hole including a tapered hole portion which diverges toward an opening. A tapered implant is inserted into the tapered hole from an enlarged side of the tapered hole portion and fitted therein. The implant includes a tapered portion in contact with the tapered hole portion, and a first thread formed on the tapered portion. With the implant fitted in the tapered hole, a member is placed in contact with the member coupling device. A second thread formed on a fastening member is engaged with the first thread of the implant in a screw coupling configuration to mount the member on the member coupling device.

7 Claims, 9 Drawing Sheets

APPARATUS FOR INSTALLING A MATERIAL WHICH IS PROCESSED BY USING CHEMICALS

CROSS-REFERENCE TO RELATED APPLICATION

This application relates to U.S. patent application Ser. No. 08/803,232 filed on Feb. 20, 1997 based on Japanese Patent Application Number 8-036530 filed on Feb. 23, 1996 and assigned to the present assignee. The content of the application is incorporated herein by reference.

BACKGROUND OF THE INVENTION

The present invention relates to an apparatus for installing a material which is processed by using chemicals.

Chemical treatment facilities are known for performing acid washing and alkaline washing as a pretreatment of plating. For such processing, members under treatment must be fixed in such treatment facilities which require use of chemicals. To this end, resin-based materials resistant to acid and alkali are generally used for a base on which a member under treatment is mounted. Also, for mounting the member under treatment on the base, it is necessary to fix the member on the base with a screw, or the like. However, the base made of the resin-based material is not suitable for a general screw fastening structure due to the soft nature of the resin-based material. Thus, in conventional chemical treatment facilities, to fix a member on a base made of a resin-based material, a coil-shaped screw is embedded as a reinforcement into an internally threaded hole formed in the base, and a bolt or the like is fastened to the screw reinforcement. This way, a member under treatment is fixed on the base using the bolt.

The reinforcement member is a type of coil spring which has a strength substantially identical to the male thread of the bolt and has a rhombic shape in cross-section. The reinforcement member is inserted into a hole which is previously threaded such that the outer periphery of the reinforcement member fits into the threaded hole, and a male thread is inserted along the inner face of the reinforcement member.

SUMMARY OF THE INVENTION

Since the above-mentioned reinforcement member is damaged by acid or the like to result in deformation thereof, it cannot be used for a long term. If this spring-shaped reinforcement member is readily replaceable, the base can be reused by replacing a damaged reinforcement member with a new one. However, since removal of the spring-shaped reinforcement member is difficult, the reuse of the base is also difficult, thus giving rise to a problem that the entire base including the reinforcement member must be replaced. Also, in treatment facilities using chemicals, it is desired in some cases that not only members under treatment but also fixtures of members coupled to a treatment facility itself, such as an open/close lid of the treatment facility be replaced in part. In such a case, a spring-shaped reinforcement member, if used in a treatment facility, would require replacement of the treatment facility itself due to the difficult removal of the reinforcement member.

It is an object of the present invention to provide an apparatus for installing a material which is processed by using chemicals, which allows for easy replacement of a part of a treatment facility in which chemicals are used.

To achieve the above object, the present invention provides an apparatus for installing a material which is processed by using chemicals for coupling a first member to a second member. The member coupling device includes a tapered implant which is embedded in a tapered hole portion formed in the first member, and is comprised of a tapered portion having an outer surface in the form of a circular truncated cone, and a projecting portion formed at an end face on an enlarged side of the tapered portion, protruding from the tapered portion, and having a plane orthogonal to the axial direction of the tapered portion. The first and second members are sandwiched between the tapered implant and a fastening member and coupled to each other by engaging the tapered implant with the fastening member in a screw coupling configuration.

With the structure as described, the tapered implant for fastening the first and second members can be readily removed and again embedded, thereby making it possible to readily replace a portion of a treatment facility which uses chemicals.

DESCRIPTION OF THE PREFERRED EMBODIMENTS

In the following, an apparatus for installing a material which is processed by using chemicals according to one embodiment of the present invention will be described in terms of the structure with reference to FIGS. 1 to 10.

Figure 1:
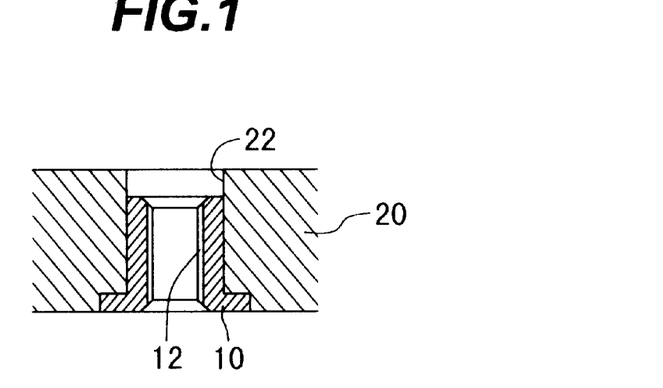
FIG. 1 is a cross-sectional view generally illustrating the structure of a member coupling device according to one embodiment.
Figure 2:
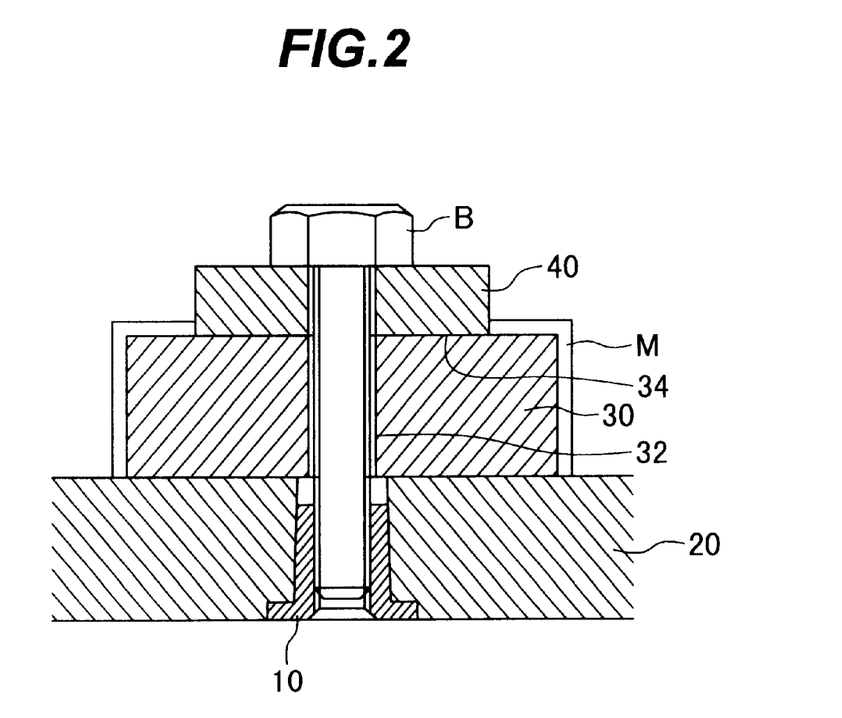
FIG. 2 is a cross-sectional view generally illustrating the structure of a member coupling device according to the embodiment.

Referring first to FIGS. 1 and 2, the apparatus for installing a material which is processed by using chemicals for plating or the like, according to the embodiment, will be described centered on the general structure thereof.

FIGS. 1 and 2 are cross-sectional views generally illustrating the structure of a member coupling device.

As illustrated in FIG. 1, a jig base 20 is previously formed with a hole 22 extending therethrough, and a tapered implant 10 is embedded in the hole 22 to form the member coupling device. The jig base 20 is made of a resin-based material which is resistant to acid and alkali.

A jig base, when made of a resin-based material, is not suitable for a general screw fastening structure due to its soft nature. In a conventional chemical treatment facility, a coil-shaped screw is embedded in an internally threaded hole formed in a base as a screw reinforcement. In contract, in this embodiment, the jig base 20 is formed with a hole 22, which is a simple opening, such that the tapered implant 10 is embedded in the hole 22. The tapered implant 10 is formed with a female thread 12 on the inner face. The tapered implant 10 may be made of a material relatively resistant to acid and alkali such as titanium, hard plastic, stainless steel, or the like. Though relatively expensive, a tapered implant made of titanium could be used for a long term due to its high resistance to acid and alkali. A tapered implant made of hard plastic, though less resistant to acid and alkali as compared with titanium, is extremely cheap so that the jig base 20 can be reused by replacing a damaged tapered implant 10 with a new one. A tapered implant made of stainless steel has intermediate characteristics between those made of titanium and hard plastic. Specifically, the tapered implant made of stainless steel is more expensive than that made of hard plastic but is cheaper than that made of titanium. Also, the stainless tapered implant, though inferior to the titanium-made tapered implant, has similar acid and alkali resistance to the hard plastic tapered implant, and has a higher strength than the hard plastic tapered implant.

As described above, when a coil-shaped screw is embedded into a jig base, the difficulties in removing the coil-shaped screw from the jig base makes it practically impossible to reuse the jig base. On the contrary, the tapered implant 10 used in this embodiment makes it possible to reuse the jig base 20 thanks to its easiness of removal from the jig base 20.

A structure for mounting a member under treatment using the tapered implant 10 will be described later with reference to FIG. 2. The tapered implant 10 will be further described later in terms of the shape with reference to FIGS. 3 and 4. Also, the recovery of the tapered implant 10 will be described later with reference to FIGS. 5 to 10.

Next, the structure for mounting a member under treatment using the tapered implant 10 according to this embodiment will be described with reference to FIG. 2.

A member 30 under treatment such as plating or the like is carried on the jig base 20 in which the tapered implant 10 has been previously embedded. Further, a masking member 40 is placed on the member 30, and a bolt B, which serves as a fastening member, is inserted through central openings extending through the member under treatment 30 and the masking member 40 and engaged with a female thread formed on the inner face of the tapered implant 10 to securely mount the member under treatment 30 on the jig base 20.

Here, as the member under treatment 30, a diamond grind stone, for example, may be mounted on the jig base 20. Of course, any other material other than the diamond grind stone may be contemplated. The diamond grind stone, after industrial diamond has been applied thereon, is formed with a plated film M to conceal the diamond to fix the diamond to the surface of a metal base (member under treatment 30). After the metal base (member under treatment 30) is machined to have predetermined dimensions, undergoes acid washing for removing contaminants and impurities on the surface.

During the acid washing of the metal base (member under treatment 30), the member under treatment 30 is fixed on the jig base 20 by the bolt B and the tapered implant 10, as illustrated in FIG. 2. Then, the member under treatment 30 is immersed in an acid solution to remove contaminants on the surface of the member under treatment 30. Here, assuming that the dimension of an internal opening 32 formed through the member under treatment 30 must be finished at a high accuracy (for example, the diameter of the hole is 10–0.05 mm), if the inner face of the hole 32 is washed with an acid solution, the dimension accuracy of the hole cannot be maintained at a predetermined level, so that a masking member 40 is used in order to prevent the inner face of the hole 32 from getting into contact with the acid solution.

As the acid washing of the member under treatment 30 is completed, the member under treatment 30 as mounted on the jig base 20 as illustrated is transported to a plating apparatus to form a plated film M on the surface of the member under treatment 30. In this event, the masking member 40 prevents a plated film from being formed on an end 34 of the member under treatment 30 as well as prevents a plated film from being formed on the inner surface of the hole 32 of the member under treatment 30. The end 34 of the member under treatment 30 is later formed into a flange which serves as a mount when the diamond grind stone is mounted to an apparatus, so that the masking member 40 additionally prevents the plated film from being formed on this portion.

The jig base 20 may have an arbitrary size. For example, assuming that the jig base 20 is in the shape of a square having a side of 500 mm and the member under treatment 30 has a diameter of approximately 90 mm, a total of 25 tapered implants 10 arranged in five rows and five columns have been previously embedded in the jig base 20, so that 25 members under treatment 30 can be simultaneously subjected to acid washing, plating or the like.

Next, the structure of the tapered implant 10 will be described with reference to FIGS. 3 and 4.

Figure 3:
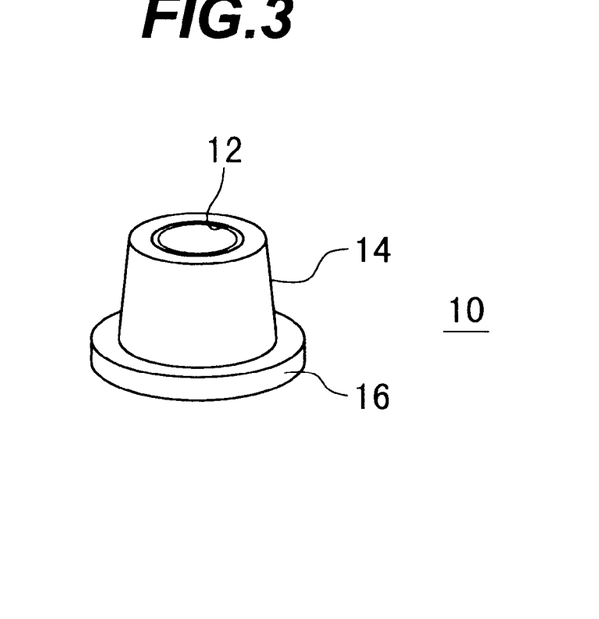
FIG. 3 is a perspective view illustrating the structure of a tapered implant for use in the member coupling device according to the embodiment.
Figure 4:
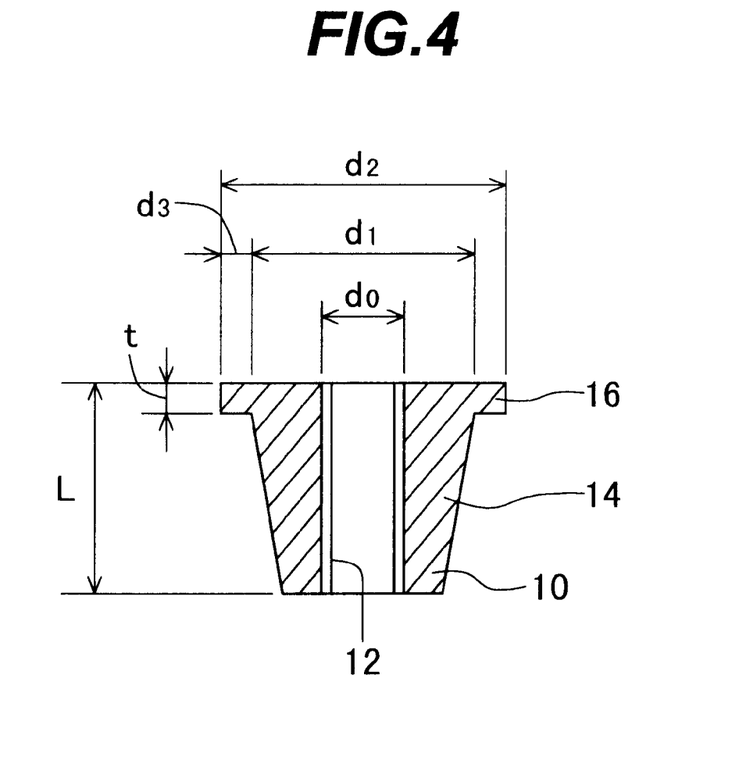
FIG. 4 is a cross-sectional view illustrating the structure of the tapered implant according to the embodiment.

FIG. 3 is a perspective view illustrating the structure of the tapered implant 10, and FIG. 4 is a cross-sectional view illustrating the structure of the tapered implant 10.

As illustrated in FIG. 3, the tapered implant 10 is comprised of a tapered portion 14 having an external appearance of a circular truncated cone shape, and a projecting portion 16 formed at a diverging end of the tapered portion 14. Also, the illustrated tapered implant 10 is formed with a female thread 12 on its inner face. The center axis of the female thread 12 is coincident with the axis of the tapered portion 14. Therefore, the female thread 12 is an extension which extends in the axial direction of the tapered portion 14.

Assume herein that the outer diameter of a screw with a male thread engaged with the female thread 12 is d0; the outer diameter of the diverging end of the tapered portion 14, i.e., the largest diameter of the tapered portion 14 is d1; the outer diameter of the projecting portion 16 is d2; and the width of the projecting portion 16 is d3. Assume also that the length of the tapered implant 10 is L; and the thickness of the projecting portion 16 is t.

When the tapered implant 10 is manufactured, for example, in correspondence to a male screw of M6, the dimensions and shapes of the respective portions are as follows. When the male screw inserted into the tapered implant 10 in engagement with the female thread formed thereon is M6, the outer diameter d0 of the male screw is 6 mm; the largest diameter d1 of the tapered portion 14 is 10 mm; the outer diameter d2 of the projecting portion 16 is 12 mm; and the width d3 of the projecting portion 16 is 1 mm. Also, the length L of the tapered implant 10 is 12 mm; an the thickness t of the projecting portion 16 is 1 mm. Further, a tapering ratio of the tapered portion 14 is chosen to be 1/20. It should be noted that the tapered implant corresponding to the male screw of M6 is not limited to the dimensions mentioned above, but may be a slightly thicker tapered implant with an increased outer diameter d2 of the projecting portion 16 and an increased largest diameter d1 of the tapered portion 14, or, on the contrary, may be a slightly thinner tapered implant.

Next, a process for embedding the tapered implant 10 into the jig base 20 in accordance with the embodiment will be described with reference to FIGS. 5A to 5D.

FIGS. 5A to 5D illustrates a sequence of steps in the process for embedding the tapered implant into the jig base.

Figure 5A:
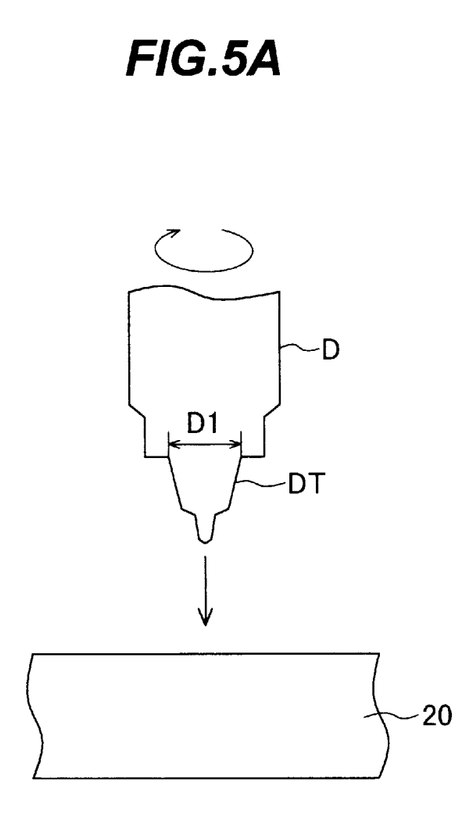
FIGS. 5A to 5D are diagrams illustrating a sequence of steps for embedding the tapered implant into a jig base in accordance with the embodiment.

As illustrated in FIG. 5A, a form drill D is used to pierce a hole through the resin made jig base 20 for inserting the tapered implant thereinto.

Figure 5B:
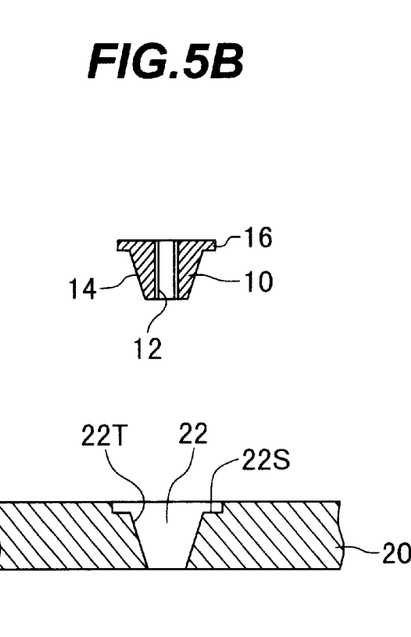

By the piercing illustrated in FIG. 5A, the jig base 20 is formed with a hole 22 as illustrated in FIG. 5B. The hole 22 is comprised of a tapered hole portion 22T and a stepped hole portion 22S. The tapered implant 10 is inserted into the hole 22. As previously described with reference to FIG. 1 or 2, the tapered implant 10 is comprised of the tapered portion 14, the projecting portion 16, and the female thread 12.

Figure 5C:
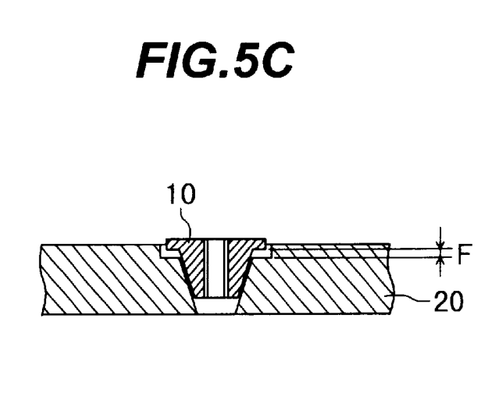

The tapered portion 14 of the tapered implant 10 is dimensioned to slightly close fit into the tapered hole portion 22T of the hole 22 into which it is fitted. Specifically, as illustrated in FIG. 5C, when the tapered implant 10 is dropped into the hole 22, the lower face of the projecting portion 16 is lifted off the stepped hole portion 22S of the hole 22. The amount F by which the lower face of the projecting portion 16 is lifted off the stepped hole portion 22S of the hole 22 is herein referred to as the "close fit margin."

In the state illustrated in FIG. 5C, the upper face of the projecting portion 16 of the tapered implant 10 is struck using a striking hammer to sink the tapered implant 10 into the hole 22 of the jig base 20, causing the projecting portion 16 to hit on the stepped hole portion 22S and stop.

Since the tapered hole portion 22T of the hole 22 is in engagement with the tapered portion 14 of the tapered implant 10, the axial center of the hole 22 is coincident with the axial center of the tapered implant 10. Therefore, by forming the hole 22 so as to be orthogonal to the surface of the jig base 20, the axial center of the tapered implant 10 is oriented orthogonal to the surface of the jig base 20. With the axial center of the female thread 12 formed in the tapered implant 10 coincident with the axial center of the tapered portion 14 of the tapered implant 10, the center axis of the female thread 12 can be readily oriented orthogonal to the surface of the jig base 20.

With the projecting portion 16 formed in an upper portion of the tapered implant 10, the lower surface of the projecting portion 16 of the tapered implant 10 hits on the stepped hole portion 22S and stops. If the projecting portion 16 were not provided, the tapered implant 10 would creep into the hole 22, causing the hole 22 of the jig base 20 to considerably deform since the jig base 20 made of an aluminum alloy is softer than the tapered implant 10 made of stainless steel. On the contrary, the tapered implant 10 formed with the projecting portion 16, as this embodiment, can prevent the tapered implant 10 from creeping into the hole 22 and accordingly prevent the hole 22 from deforming.

Figure 5D:
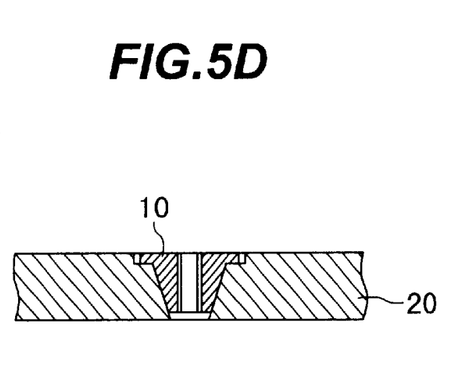

In a state illustrated in FIG. 5D, since the tapered implant 10 is held by the jig base 20 with a friction force, it is necessary to accurately manage the close fit margin F for the hole 22. To this end, it is important to accurately machine the tapered portion 14 of the tapered implant 10 and simultaneously machine the tapered hole portion 22T of the hole 22 and the stepped hole portion 22S. The accuracies of two blades, i.e., a tapered portion machining blade and a stepped portion machining blade of the form drill D, for simultaneously machining the tapered hole portion 22T and the step portion 22S, will dominate the accuracy of the close fit of the tapered implant 10. Specifically, since the tapered implant 10 is struck into the hole as it enlarges the hole 22, and stops when the projecting portion 16 comes in contact with the stepped hole portion 22S of the hole 22, the tapered hole portion 22T and the stepped hole portion 22S of the hole 22 must be machined at a high accuracy.

It is also necessary to accurately manage the close fit margin F of the tapered implant 10 in order to provide a stable fastening structure. For example, in a tapered implant manufactured in correspondence to a male screw of M6, assume that the largest diameter d1 of the tapered portion 14 is 10 mm, and the tolerance is in a range of +0.02 mm to +0.04 mm for this largest diameter d1. Therefore, an average tolerance is +0.03 mm. Assume also that the largest diameter D1 of the tapered portion machining blade DT of the form drill D for forming the tapered hole portion 22T of the hole 22 is 6 mm, and the tolerance is in a range of −0.01 mm to +0 mm for this largest diameter D1. Therefore, an average tolerance is −0.005 mm. In this way, the largest diameter of the tapered hole portion 22T of the hole 22 formed by the tapered portion machining blade DT is chosen to be larger by 0.035 mm than the largest diameter d1 of the tapered portion 14 of the tapered implant 10. Assume herein that the tapering ratio of the tapered portion machining blade DT of the form drill D and the tapering ratio of the tapered portion 14 of the tapered implant 10 are both chosen to be 1/20. As a result, the close fit margin F is calculated to be 0.7 mm (=0.035 mm×20). In other words, the close fit margin F of the tapered implant 10 for the hole 22 can be accurately managed by accurately machining the tapered portion 14 of the tapered implant 10 and simultaneously machining the tapered hole portion 22T and the stepped hole portion 22S of the hole 22.

With the tapering ratio fixed at 1/20 for the tapered portion 14 of the tapered implant 10 and the tapered hole portion 22T of the hole 22 formed through the jig base 20, the largest diameters d1 of the tapered portion 14 of the tapered implant 10 was varied to alter the close fit margin F for the tapered portion for testing a situation in which the tapered implant would be struck into the hole 22. The result of the testing shows that while the close fit margin F for the tapered portion 14 was altered from 0.01 to 0.07 mm, the tapered implant 10 could be readily struck into the hole 22 in any case, and was held extremely satisfactorily without rotations. Even when a male screw was fastened into the tapered implant 10, the male screw could be firmly fastened without causing the tapered implant 10 to rotate.

In order for the tapered implant 10 to be readily struck into the jig base 20 and reliably held therein after it has been embedded, a tapering angle must be smaller than at least a friction angle. While the tapering ratio of 1/20 is a significantly favorable value in consideration of easiness of striking the tapered implant 10 into and holding the same in the jig base 20, the tapering ratio in a range of 1/50 to 1/10 may be preferably applied, and the tapering ratio up to approximately 1/7 to 1/6 could also be applied in some cases. However, a larger tapering ratio causes an increased striking force, and it was observed that with the tapering ratio exceeding 1/6, the tapered implant 10 once struck into the jig base 20 was bounced out.

Next, a method of recovering the jig base 20 having the tapered implant 10 embedded therein in accordance with the embodiment will be described with reference to FIGS. 6 to 10.

As described with reference to FIG. 1, the tapered implant 10 is embedded in the jig base 20. The tapered implant 10 may become more loosely fit in the jig base 20 due to the influence of a residual stress produced near the hole 22 when the hole 22 is pierced into the jig base 20, a residual stress which remains in the jig base 20 when the tapered implant 10 is struck into the hole 22, and so on, together with aging changes. Also, as described with reference to FIG. 2, the member under treatment 30 is mounted on the jig base 20 with the bolt B and the tapered implant 10. Since the jig base 20 is transported with the member under treatment 30 mounted thereon, the tapered implant 10 is applied with a load of the m ember under treatment 30, causing in some cases a deformation of the hole 22 of the jig base 20 to reduce the close fitness of the tapered implant 10 to an insufficient level. In such a case, the tapered implant 10 is removed from the jig base 20, the hole 22 is machined again, the deformed tapered port ion 22T is removed from the hole 22, and then the original tapered implant 10 is again struck into the jig implant 20, thereby making it possible to reuse the jig base 20.

Figure 6A:
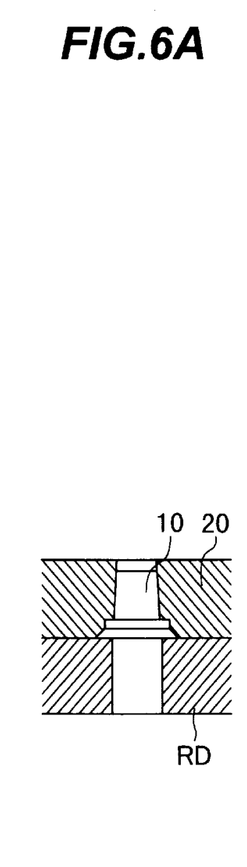
FIGS. 6A to 6E are diagrams illustrating a sequence of steps for removing the tapered implant from the jig base in accordance with the embodiment.
Figure 7A:
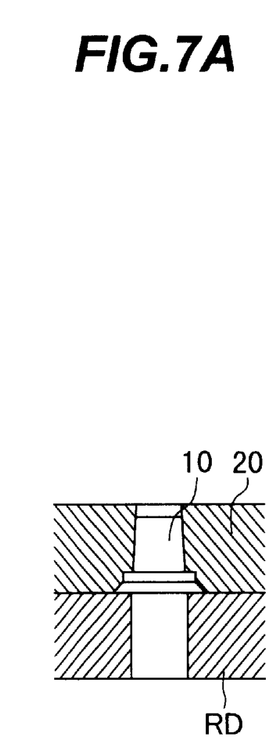
FIGS. 7A to 7E are diagrams illustrating a sequence of steps for removing the tapered implant from the jig base in accordance with the embodiment.

First, a process for the removal of the tapered implant will be described with reference to FIGS. 6 and 7.

FIGS. 6A to 6E illustrate a sequence of steps in the process for removing the tapered implant using a drill press or a dedicated machine.

As illustrated in FIG. 6A, the jig base 20 having the tapered implant 10 embedded therein is placed on a bearer RD.

Figure 6B:
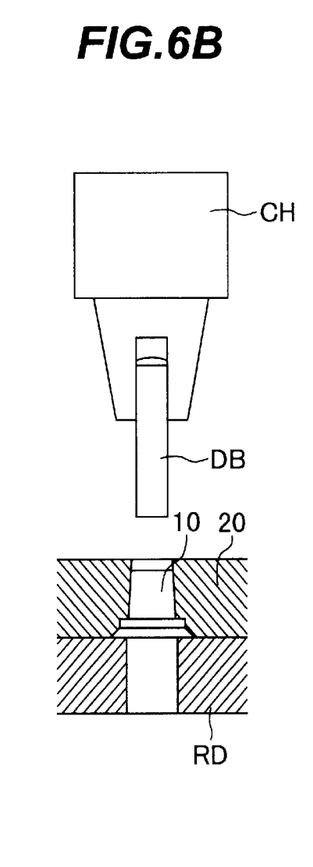

Next, as illustrated in FIG. 6B, an extracting rod DB is set at a chuck CH at the tip of the drill press or dedicated machine.

Figure 6C:
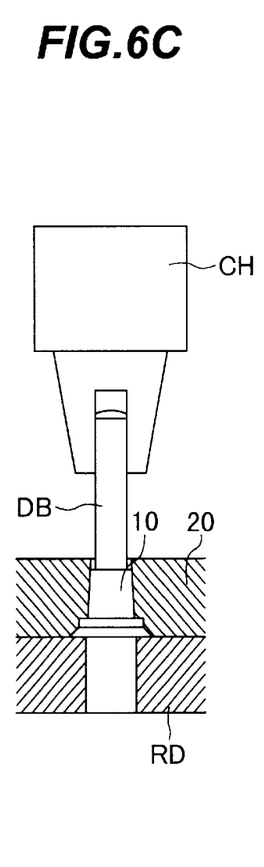

Next, as illustrated in FIG. 6C, the chuck CH at the tip of the drill press or dedicated machine is lowered to press the leading end of the extracting rod DB against the reduced end (opposite side of the end at which the projecting portion is formed) of the tapered implant 10.

Figure 6D:
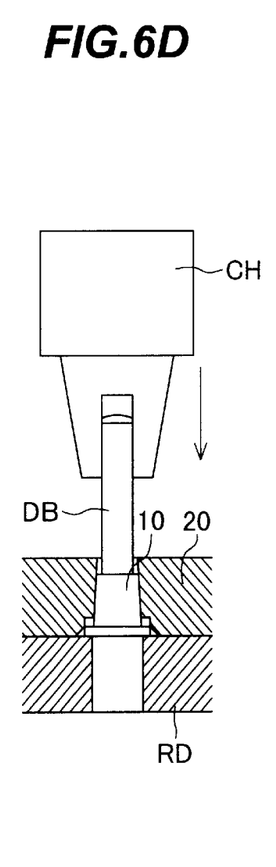

Next, as illustrated in FIG. 6D, the extracting rod DB is further lowered to extrude the tapered implant 10 embedded in the jig base 20 so that the tapered implant 10 is removed from the jig base 20.

Figure 6E:
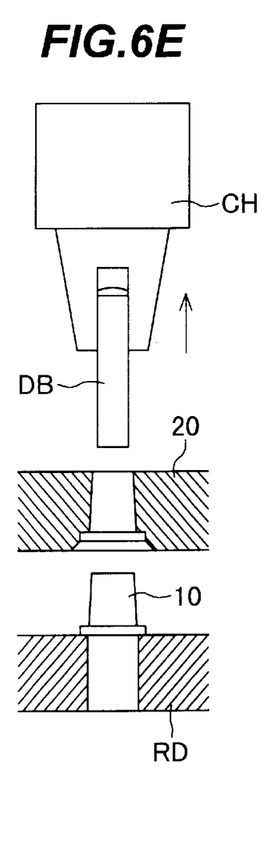

Next, as illustrated in FIG. 6E, the extracting rod DB is elevated, and the jig base 20 is also elevated, resulting in the extracted tapered implant 10 remaining on the bearer RD.

Next, a process for manually removing the tapered implant from the jig base will be described with reference to FIGS. 7A to 7E.

As illustrated in FIG. 7A, the jig base 20 having the tapered implant 10 embedded therein is placed on the bearer RD.

Figures 7B, 7C:
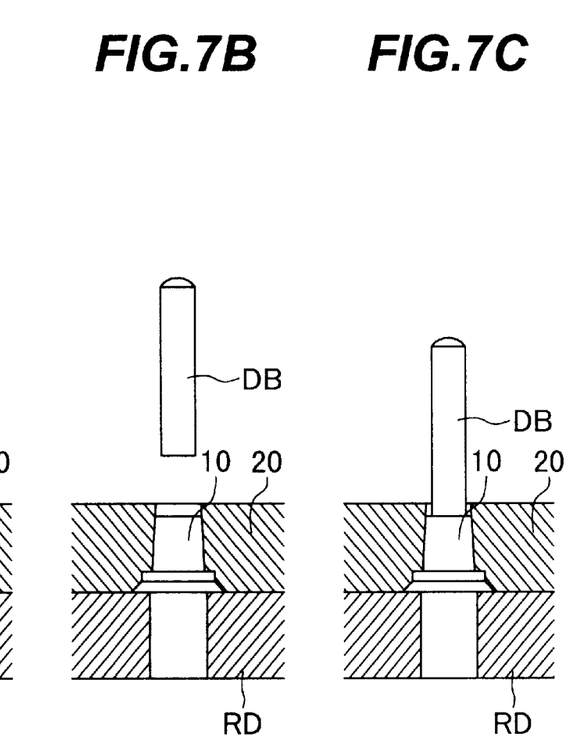

Next, as illustrated in FIG. 7B, the extracting rod DB is prepared above the tapered implant 10.

Next, as illustrated in FIG. 7C, the leading end of the extracting rod DB is pressed against the reduced end (opposite side of the end at which the projecting portion is formed) of the tapered implant 10.

Figure 7D:
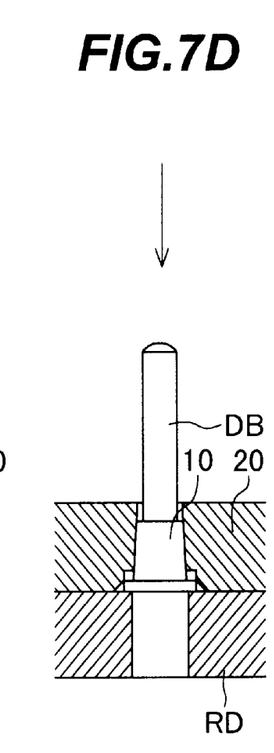

Next, as illustrated in FIG. 7D, a force is applied to the end of the extracting rod DB using a hammer or the like to extrude the tapered implant 10 embedded in the jig base 20, thereby removing the tapered implant 10 from the jig base 20.

Figure 7E:
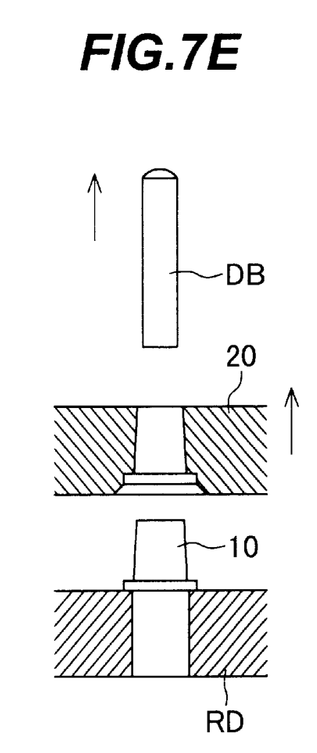

Next, as illustrated in FIG. 7E, the extracting rod DB is removed from the jig base 20, and the jig base 20 is elevated, resulting in the extracted tapered implant 10 remaining on the bearer RD.

Next, a process for machining the tapered portion in the hole for recovery will be described with reference to FIGS. 8A to 8D.

FIGS. 8A to 8D illustrate a sequence of steps in the process for machining the tapered portion of the hole extending through the jig base for recovery.

Figure 8A:
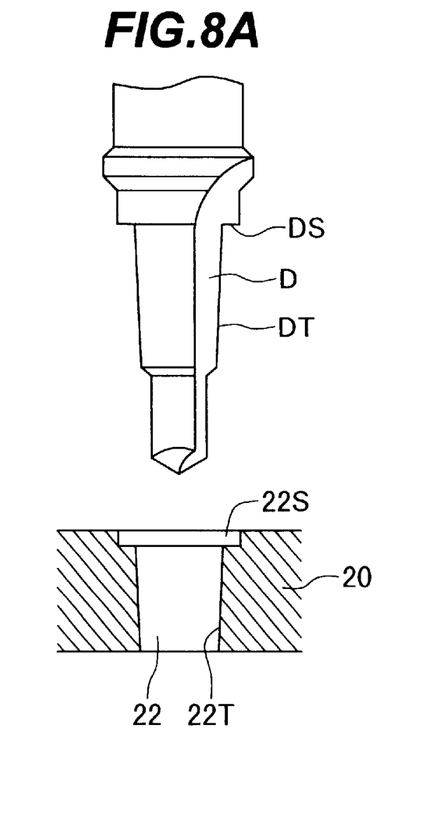
FIGS. 8A to 8D are diagrams illustrating a sequence of steps for machining the tapered hole in the jib base for reuse in accordance with the embodiment.

As illustrated in FIG. 8A, upon completion of the operation for removing the tapered implant in FIG. 6 or 7, the hole 22 remains in the jig base 20. In the hole 22, particularly, a portion of the tapered portion 22T often suffers from deformation. To restore the hole 22, a form drill D is prepared. The form drill D, which is the same as that used to form the hole 22 as described in connection with FIG. 5A, has a tapered blade DT in the direction of the tip.

Figure 8B:
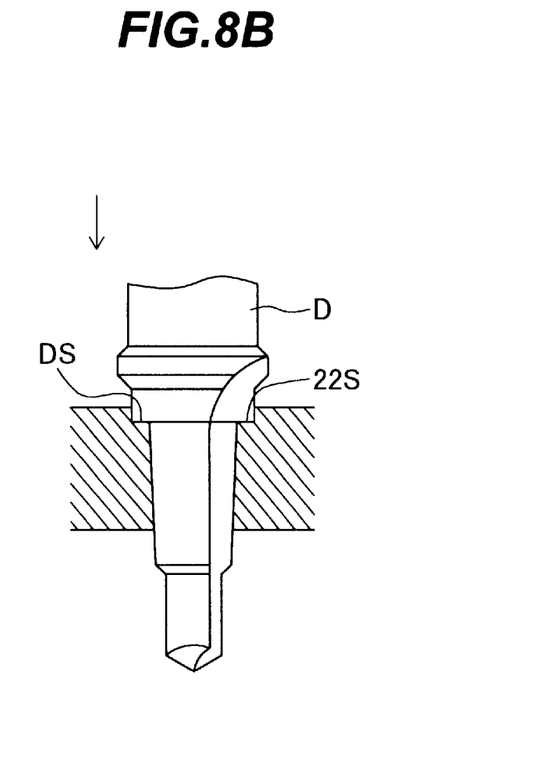

Next, as illustrated in FIG. 8B, the form drill D is lowered to press a step portion DS of the drill D against the step portion 22S of the hole 22 to position the drill D in the hole 22.

Figure 8C:
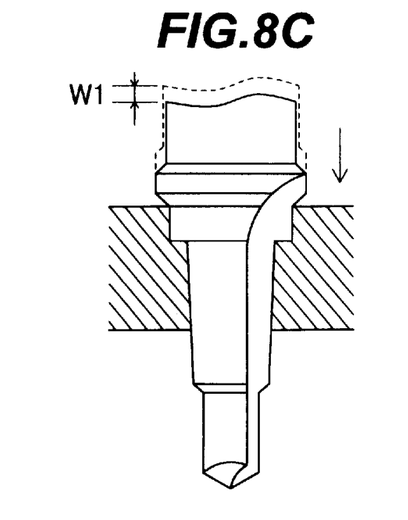

Next, as illustrated in FIG. 8C, the form drill D is lowered by a predetermined amount Wi from the position indicated in FIG. 8B to cut the hole 22 with the drill D.

Figure 8D:
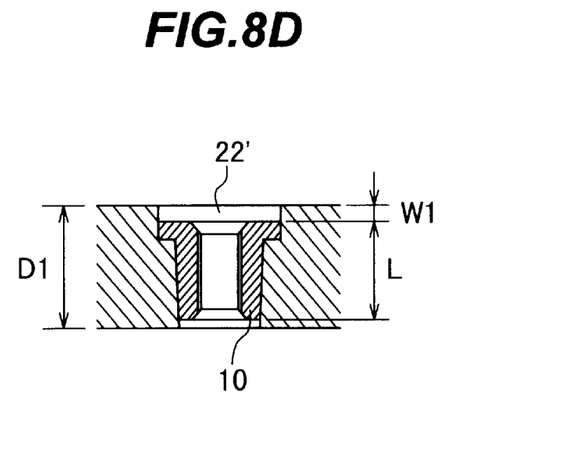

FIG. 8D illustrates how the tapered implant 10 is embedded again in a hole 22' restored by the cutting described with reference to FIG. 8C. The tapered implant 10 is embedded at a position deeper than the original position by a depth WI. An investigation on the secondary cut amount W1 revealed that a deformed hole was solved sufficiently only by cutting approximately 0.1 mm, so that the newly embedded tapered implant was held in the hole with a sufficient strength. Assuming for example, that the jig base 20 has a plate thickness D1 of 20 mm and the tapered implant 10 has a length L of 12 mm, a permitted amount for the cutting to prevent the end of the tapered implant 10 from protruding from the surface of the jig base 20 is limited to 8 mm (20–12 mm), so that if the amount of secondary cutting is chosen to be 0.1 mm, the jig base 20 can be reused 80 times by the secondary cutting.

Figure 9A:
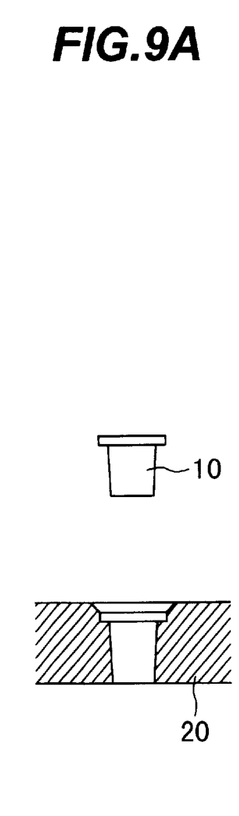
FIGS. 9A to 9E are partially cross-sectional views illustrating a sequence of steps for embedding the tapered implant into a jig base in accordance with the embodiment.
Figure 10A:
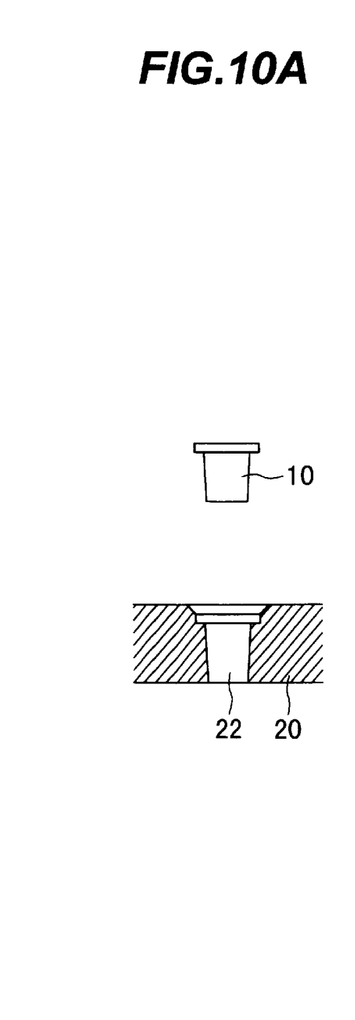
FIGS. 10A to 10E are diagrams illustrating a sequence of steps for embedding the tapered implant into a jig base in accordance with the embodiment.

Next, a process for embedding the tapered implant will be described with reference to FIGS. 9 and 10.

FIGS. 9A to 9E illustrate a sequence of steps in the process for embedding the tapered implant using a drill press or a dedicated machine.

First, as illustrated in FIG. 9A, the jig base 20 and the tapered implant 10 are prepared.

Figure 9B:
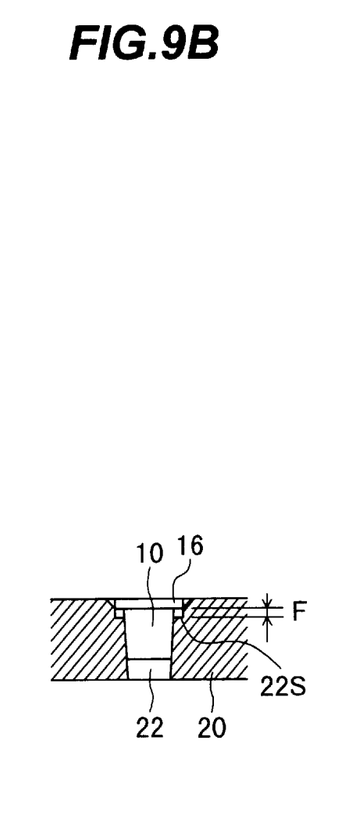

Next, as illustrated in FIG. 9B, the tapered implant 10 is inserted into the hole 22 of the jig base 20. With the tapered portion of the implant 10 in contact with the tapered portion of the hole 22, the tapered implant 10 is carried on the jig base 20 such that the projecting portion 16 of the tapered implant 10 is lifted off by a close fit margin F above the step portion 22S of the hole 22.

Figure 9C:
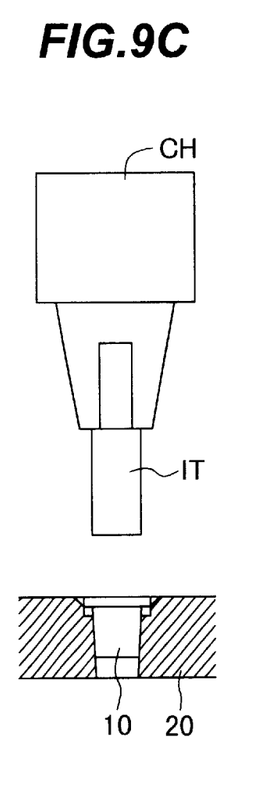

Next, as illustrated in FIG. 9C, an embedding jig IT is set in the chuck CH at the tip of the drill press or dedicated machine.

Figure 9D:
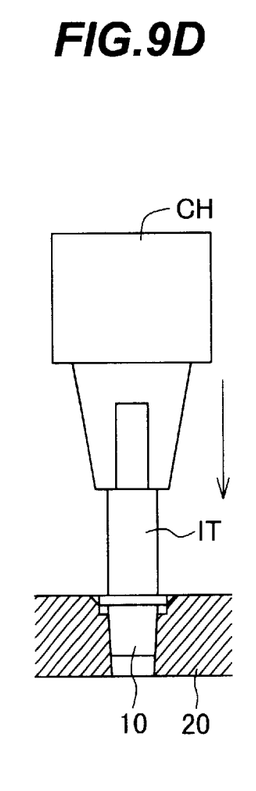

Next, as illustrated in FIG. 9D, the chuck CH at the tip of the drill press or dedicated machine is lowered to press the leading end of the embedding jig IT against the projecting portion 16 of the tapered implant 10.

Figure 9E:
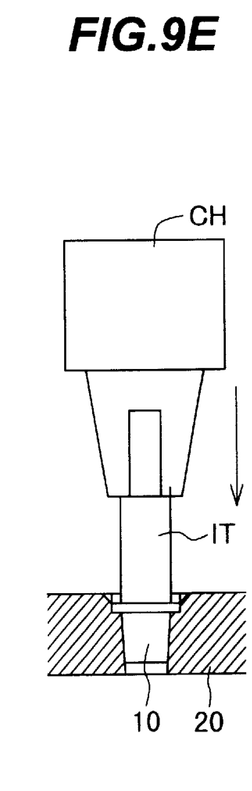

Next, as illustrated in FIG. 9E, the embedding jig IT is further lowered to embed the tapered implant 10 deep into the hole 22 of the jig base 20.

Next, a process for manually embedding the tapered implant into the jig base will be described with reference to FIGS. 10A to 10E.

First, as illustrated in FIG. 10A, the jig base 20 and the tapered implant 10 are prepared.

Figure 10B:
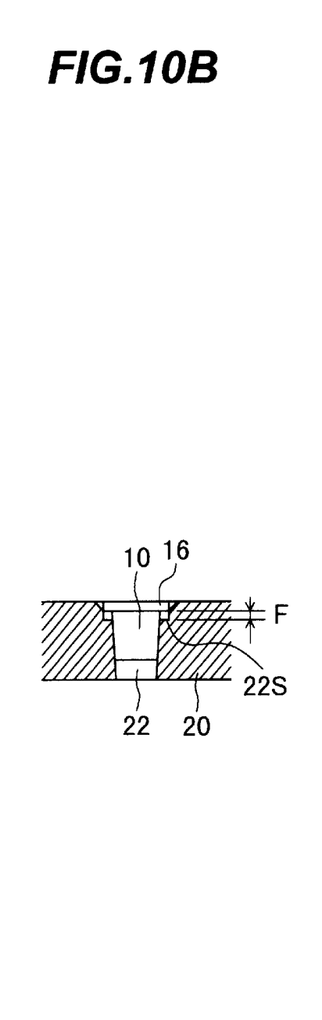

Next, as illustrated in FIG. 10B, the tapered implant 10 is inserted into the hole 22 of the jig base 20. With the tapered portion of the implant 10 in contact with the tapered portion of the hole 22, the projecting portion 16 of the tapered implant 10 is carried on the jig base 20 such that the projecting portion 16 of the tapered implant 10 is lifted off by a close fit margin F above the step portion 22S of the hole 22.

Figure 10C:
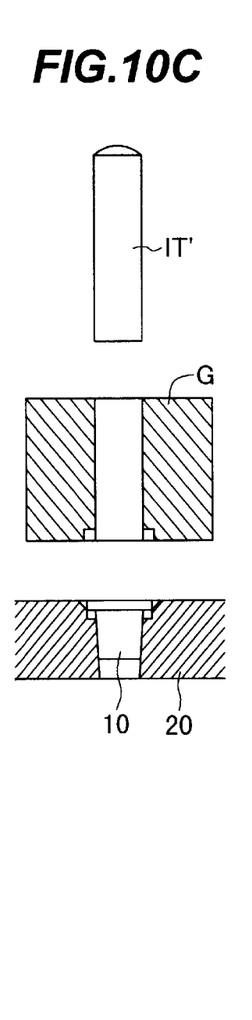

Next, as illustrated in FIG. 10C, a guide G having a throughhole extending through the center thereof, and a press-fit jig IT' are prepared.

Figure 10D:
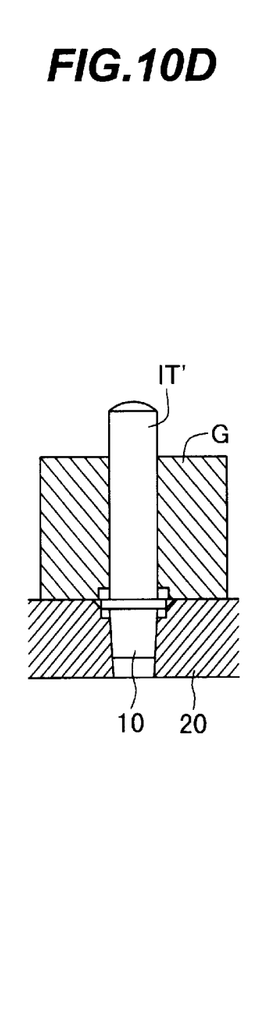

Next, as illustrated in FIG. 10D, the guide G is set on the tapered implant 10, and the press-fit jig IT' is inserted into the central throughhole of the guide G.

Figure 10E:
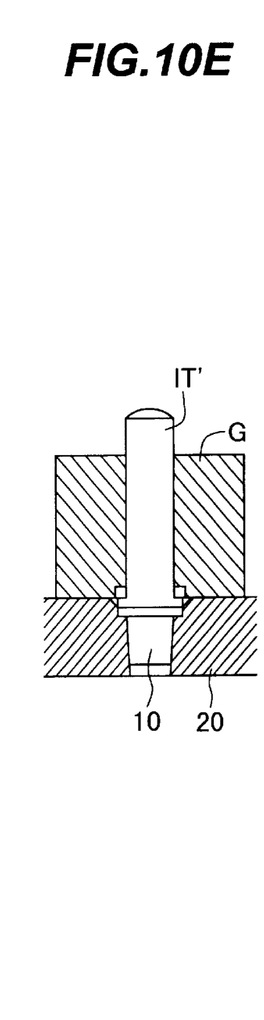

Next, as illustrated in FIG. 10E, the top of the press-fit jig IT' is struck with a hammer or the like to embed the tapered implant 10 into the hole 22 of the jig base 20.

It should be noted that in the example illustrated in FIGS. 8A to 8D, when the same form drill is used for the first hole machining and for the hole recovery machining, an additional form drill need not be provided. Alternatively, however, the jig base may be formed with a hole having a larger diameter using another form drill having a larger diameter than the form drill which is used for first machining the hole. In this event, a tapered implant struck into the hole should have a larger outer diameter conforming to the recovered hole, though a female thread formed on the inner face is the same as that of the tapered implant which has been previously inserted into the previous hole.

In this way, it is possible to improve a mounting strength of the tapered implant when it is embedded in the jig base.

While the foregoing embodiment has been described for the structure for mounting a member under treatment on a jig base, this embodiment may be similarly applied to a structure for fixing a jig base within a treatment facility which uses chemicals. Also, this embodiment may be applied to a structure for fixing a member such as a motor within a treatment facility which uses chemicals. Further, this embodiment may be applied to a mounting structure for a member coupled to the body of a treatment facility, such as an open/close lid of a treatment facility.

As described above, according to the foregoing embodiment, a portion of members can be readily replaced in a treatment facility using chemicals.

Next, the structure of an apparatus for installing a material which is processed by using chemicals according to another embodiment will be described with reference to FIG. 11.

Figure 11:
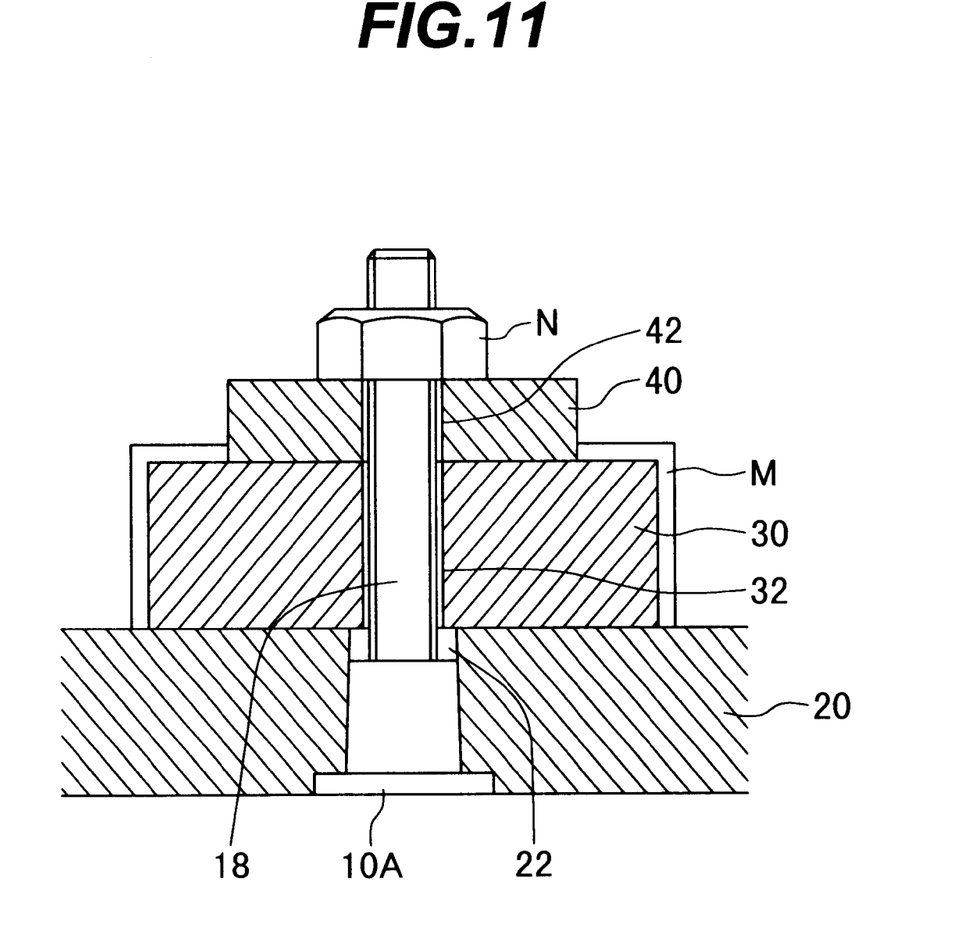
FIG. 11 is a cross-sectional view generally illustrating the structure of a member coupling device according to another embodiment.

FIG. 11 is a cross-sectional view generally illustrating the structure of a member coupling device according to another embodiment of the present invention.

The embodiment of FIG. 11 differs from the embodiment of FIG. 2 in that a tapered implant 10A in the former comprises a bolt 18 such that a nut N is fixed by a leading end portion thereof in engagement with the nut N.

A member under treatment 30 is placed on a jig base 20 which has the tapered implant 10A previously embedded therein such that the bolt 18 is inserted though a hole 32 of the member under treatment 30.

Next, a masking member 40 is carried on the member 30 such that a hole 42 of the masking member 40 is inserted on the bolt 18. Further, the Nut N serving as a fastening member is screwed onto a leading end portion of the bolt 18, so that the member under treatment 30 can be mounted to the jig base 20 by the screw coupling of the bolt 18 of the tapered implant 10A with the nut N. Since the bolt 18 forming part of the tapered implant 10A serves as a guide for the member under treatment 30, the member under treatment 30 can be readily carried on the jig base 20.

According to this embodiment, since the tapered implant 10A can be readily removed, the jig base 20 can be reused.

As will be appreciated from the foregoing, the preferred embodiments of the present invention permit a portion of members to be readily replaced in a treatment facility which uses chemicals.

What is claimed is:

1. A member coupling device for mounting thereon a member under treatment with a chemical, comprising:

a base having a hole which provides a tapered hole portion that diverges toward an opening, and a stepped hole portion of columnar shape which is provided neighboring an enlarged end of said tapered hole portion, and having a larger diameter than that of said enlarged end;

a tapered implant inserted into said hole from an enlarged side of said tapered hole portion and fitted in said tapered hole, said tapered implant having an outer surface in the form of a circular truncated cone, said tapered implant comprised of a tapered portion in contact with said tapered hole portion, a projecting portion formed at an end coupled to an enlarged end of said tapered portion, projecting from said tapered portion, having an under surface perpendicular with an axial direction of said tapered portion, and in contact with a bottom of said stepped hole portion under treatment around said tapered hole portion by insertion of said projection portion into said stepped hole portion, and a female thread formed inside of said tapered portion in said axial direction of said taper portion; and a fastening member formed with a male thread for screw coupling with said female thread of said implant, wherein said member under treatment is placed in contact with said base with said implant being fitted in said hole, and said member is mounted to said member coupling device by inserting said fastening member into said female thread of said implant through said hole formed in said member, and engaging said female thread of said implant with said male thread in a screw coupling configuration.

2. A member coupling device for mounting thereon a member under treatment with a chemical, comprising:

a base having a hole which provides a tapered hole portion which diverges toward an opening, and a stepped hole portion of columnar shape which is provided neighboring an enlarged end of said tapered hole portion, and having a larger diameter than that of said enlarged end;

a tapered implant inserted into said hole from an enlarged side of said tapered hole portion and fitted in said tapered hole, said tapered implant having an outer surface in the form of a circular truncated cone, said tapered implant comprised of a tapered portion in contact with said tapered hole portion, a projecting portion formed at an end coupled to an enlarged end of said tapered portion, projecting from said tapered portion, having an under surface perpendicular with an axial direction of said tapered portion, and in contact with a bottom of said stepped hole portion under treatment around said tapered hole portion by inserting said projecting portion into said stepped hole portion, and a bolt on an end face on either an enlarged side or a reduced side of said tapered portion, said bolt being formed with a male thread;

a nut having a female thread screw coupling with said male thread of said implant and formed on an inner face thereof; and wherein said member under treatment is placed in contact with said base with said implant being fitted in said hole, and said bolt is inserted through a hole formed through said member and inserted in said female thread of said nut, with said male thread of said bolt being in screw coupling with said female thread of said nut, to mount said member under treatment on said member coupling device.

3. A member coupling device according to claim 1, further comprising a masking member for a chemical placed in contact with said member under treatment, wherein said fastening member is inserted into said female thread of said implant through said hole formed in said masking member and said hole formed in said member, and said member under treatment and said masking member are mounted on said member coupling device by engaging said female thread of said implant with said male thread in a screw coupling configuration.

4. A member coupling device according to claim 1, wherein:

said base is formed of a resin material; and said implant is formed of a material selected from a group consisting of titanium, hard plastic and stainless steel.

5. A treatment apparatus for treating a member with a chemical, comprising:

a member coupling device placed in said treatment apparatus for mounting said member thereon;

a hole formed in said member coupling device and having a tapered hole portion which diverges toward an opening, and a stepped hole portion of columnar shape which is provided neighboring an enlarged end of said tapered hole portion, and having a larger diameter than that of said enlarged end;

a tapered implant inserted into said hole from an enlarged side of said tapered hole portion and fitted in said tapered hole, said tapered implant having an outer surface in the form of a circular truncated cone, said tapered implant comprised of a tapered portion in contact with said tapered hole portion, a projecting portion formed at an end coupled to an enlarged end of said tapered portion, projecting from said tapered portion, having an under surface perpendicular with an axial direction of said tapered portion, and in contact with a bottom of said stepped hole portion under treatment around said tapered hole portion by inserting said projecting portion into said stepped hole portion, and a female thread formed inside of said tapered portion in said axial direction of said tapered portion; and a fastening member formed with a male thread for screw coupling with said female thread of said implant, wherein said member under treatment is placed in contact with said member coupling device with said implant being fitted in said hole, and said member under treatment is mounted to said member coupling device by inserting said fastening member into said female thread of said implant through said hole formed in said member, and engaging said female thread of said implant with said male thread in a screw coupling configuration.

6. A treatment apparatus for treating a member with a chemical, comprising:

for mounting thereon a member under treatment with a chemical, comprising:

a member coupling device placed in said treatment apparatus for mounting said member thereof;

a hole formed in said member coupling device and having a tapered hole portion which diverges toward an opening, and a stepped hole portion of columnar shape which is provided neighboring an enlarged end of said tapered hole portion, and having a larger diameter than that of said enlarged end;

a tapered implant inserted into said hole from an enlarged side of said tapered hole portion and fitted in said tapered hole, said tapered implant having an outer surface in the form of a circular truncated cone, said tapered implant comprised of a tapered portion in contact with said tapered hole portion, a projecting portion formed at an end coupled to an enlarged end of said tapered portion, projecting from said tapered portion, having an under surface perpendicular with an axial direction of said tapered portion, and in contact with a bottom of said stepped hole portion under treatment around said tapered hole portion by inserting said projecting portion into said stepped hole portion, and a bolt on an end face on either an enlarged side or a reduced side of said tapered portion, said bolt being formed with a male thread; and a nut having a female thread screw coupling with said male thread of said implant and formed on an inner face there of; and wherein said member under treatment is placed in contact with said base with said implant being fitted in said hole, and said bolt is inserted through a hole formed through said member and inserted in said female thread of said nut, with said male thread of said bolt being in screw coupling with said female thread of said nut, to mount said member under treatment on said member coupling device.

7. A treatment apparatus according to claim 6, wherein said member coupling device further comprises a masking member for a chemical placed in contact with said member under treatment, wherein said fastening member is inserted into said female thread of said implant through said hole formed in said masking member and said hole formed in said member, and said member under treatment and said masking member are mounted on said member coupling device by engaging said female thread of said implant with said male thread in a screw coupling configuration.

* * * * *